United States Patent
Simmons et al.

(10) Patent No.: US 9,914,454 B2
(45) Date of Patent: Mar. 13, 2018

(54) VEHICLE SPEED CONTROL SYSTEM

(71) Applicants: Kelsey-Hayes Company, Livonia, MI (US); Lucas Automotive GmbH, Koblenz (DE)

(72) Inventors: Sean Simmons, Canton, MI (US); Shawn Hawley, Ann Arbor, MI (US); Charles Anthony Bartlett, Commerce Township, MI (US); Elmar Hoffmann, Meinborn (DE)

(73) Assignees: Kelsey-Hayes Company, Livonia, MI (US); Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/650,456

(22) PCT Filed: Dec. 9, 2013

(86) PCT No.: PCT/US2013/073958
§ 371 (c)(1),
(2) Date: Jun. 8, 2015

(87) PCT Pub. No.: WO2014/089580
PCT Pub. Date: Jun. 12, 2014

(65) Prior Publication Data
US 2015/0321671 A1 Nov. 12, 2015

Related U.S. Application Data

(60) Provisional application No. 61/734,824, filed on Dec. 7, 2012.

(51) Int. Cl.
*B60W 30/14* (2006.01)
*B60W 10/06* (2006.01)
*B60W 10/18* (2012.01)

(52) U.S. Cl.
CPC .......... *B60W 30/143* (2013.01); *B60W 10/06* (2013.01); *B60W 10/18* (2013.01);
(Continued)

(58) Field of Classification Search
CPC .... B60W 30/143; B60W 10/18; B60W 10/06; B60W 2520/10; B60W 2710/18;
(Continued)

(56) References Cited

U.S. PATENT DOCUMENTS 6,095,942 A  8/2000 Yamaguchi et al.
7,319,927 B1  1/2008 Sun et al.
(Continued)

FOREIGN PATENT DOCUMENTS

EP  2114717 B1  2/2012

OTHER PUBLICATIONS

PCT International Search Report, Application No. PCT/US2013/73958, dated Aug. 1, 2014.

*Primary Examiner* — Jason Holloway
(74) *Attorney, Agent, or Firm* — MacMillan, Sobanski & Todd, LLC

(57) ABSTRACT

This invention relates to a vehicle speed control system, configured with off-road performance features, that will allow the driver to travel at a set speed in a smooth, controlled manner on various unmaintained surfaces without requiring the driver to press the brake or accelerator pedal. The vehicle speed control system uses a brake controller to control the wheel brakes, and an engine controller to control the engine/drivetrain torque, separate or in combination, to maintain a target speed.

15 Claims, 12 Drawing Sheets

(52) U.S. Cl.
CPC ... *B60W 2510/182* (2013.01); *B60W 2520/00* (2013.01); *B60W 2520/10* (2013.01); *B60W 2550/142* (2013.01); *B60W 2710/0666* (2013.01); *B60W 2710/18* (2013.01); *B60W 2720/10* (2013.01)

(58) Field of Classification Search
CPC ..... B60W 2710/0666; B60W 2720/10; B60W 2510/182; B60W 2520/00; B60W 2550/142
See application file for complete search history.

(56) References Cited

U.S. PATENT DOCUMENTS

| | | | | |
|---|---|---|---|---|
| 8,046,145 | B2 * | 10/2011 | Ishida | B60K 31/02 180/244 |
| 8,326,510 | B2 | 12/2012 | Tang et al. | |
| 9,493,160 | B2 * | 11/2016 | Kelly | B60K 31/02 |
| 9,533,684 | B2 * | 1/2017 | Kelly | B60W 30/143 |
| 2003/0200016 | A1 * | 10/2003 | Spillane | B60G 17/0195 701/36 |
| 2004/0215385 | A1 * | 10/2004 | Aizawa | B60K 31/00 701/93 |
| 2007/0061059 | A1 * | 3/2007 | Inoue | B60W 10/06 701/41 |
| 2007/0119163 | A1 * | 5/2007 | Tatsuno | B60W 30/18072 60/493 |
| 2007/0255477 | A1 * | 11/2007 | Okuda | B60K 6/442 701/93 |
| 2009/0037069 | A1 * | 2/2009 | Inoue | B60W 10/06 701/94 |
| 2009/0145673 | A1 | 6/2009 | Soliman et al. | |
| 2010/0100295 | A1 * | 4/2010 | Inoue | B60W 10/06 701/69 |
| 2011/0125376 | A1 * | 5/2011 | Chappell | B60W 10/06 701/65 |
| 2012/0220424 | A1 | 8/2012 | Staudinger et al. | |
| 2012/0283928 | A1 | 11/2012 | Bjernetun et al. | |
| 2015/0203117 | A1 * | 7/2015 | Kelly | B60K 31/02 701/91 |
| 2015/0217771 | A1 * | 8/2015 | Kelly | B60K 28/16 701/93 |
| 2015/0232092 | A1 * | 8/2015 | Fairgrieve | B60W 30/143 701/93 |

* cited by examiner

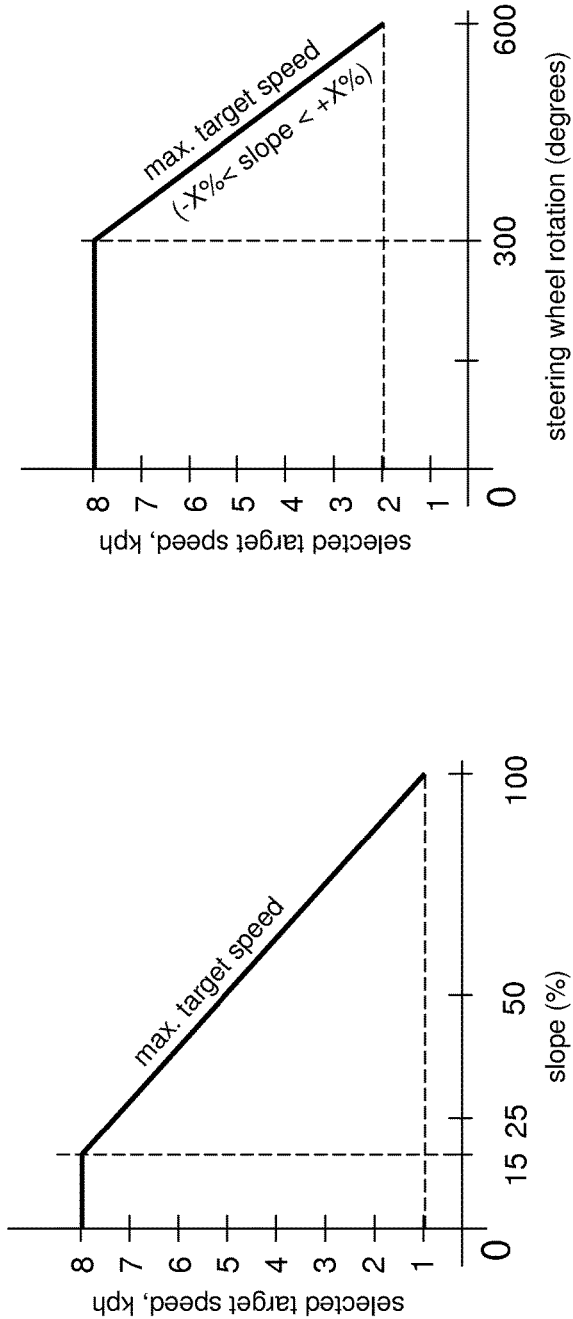
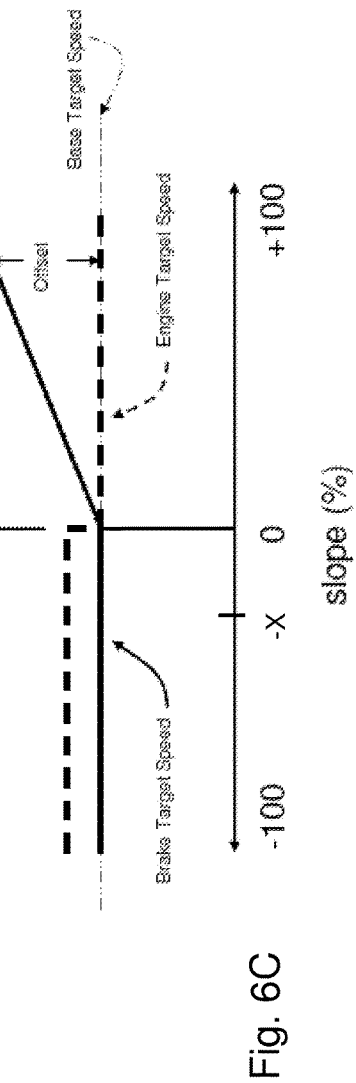
Fig. 6A
Fig. 6B
Fig. 6C

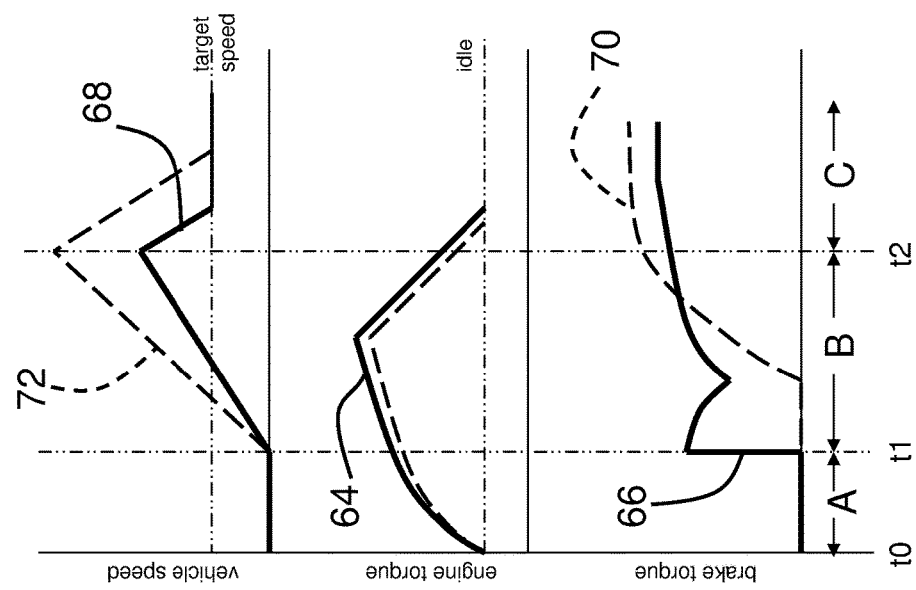
Fig. 10C
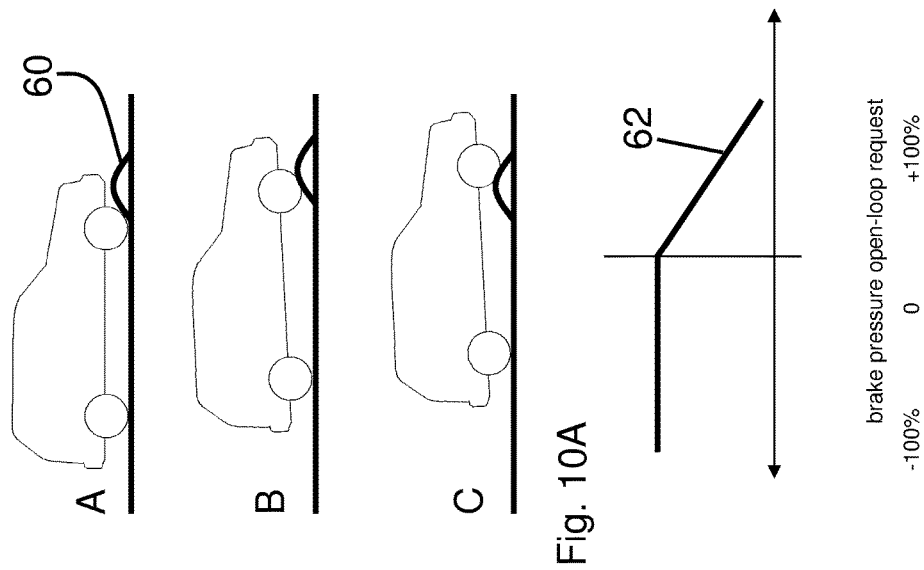
Fig. 10A
Fig. 10B

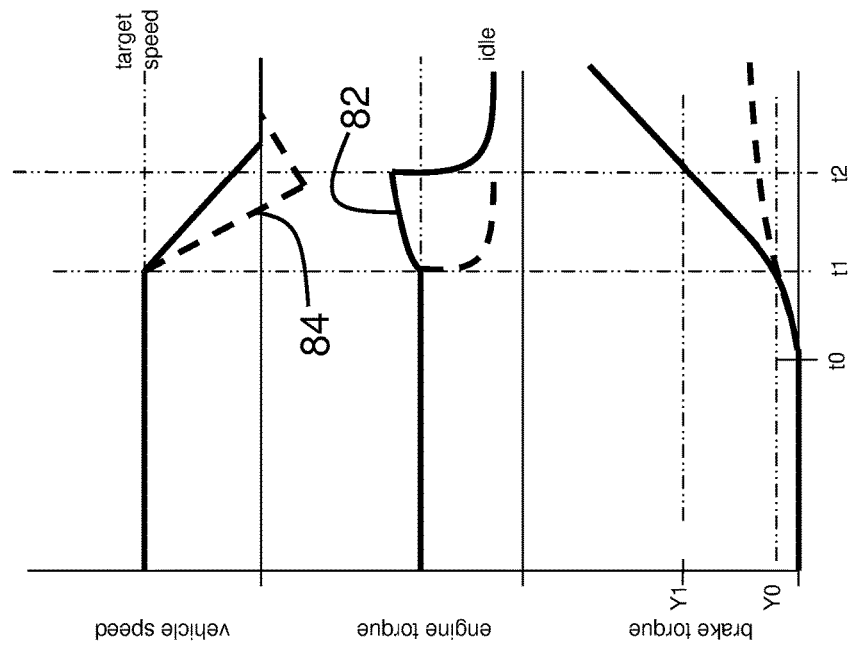
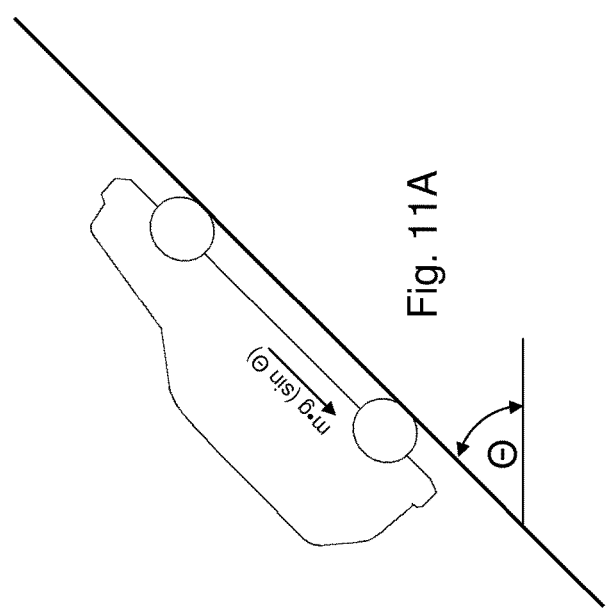
Fig. 11A
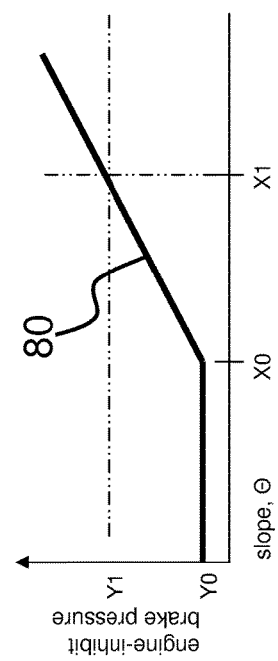
Fig. 11B
Fig. 11C

VEHICLE SPEED CONTROL SYSTEM

CROSS-REFERENCE TO RELATED APPLICATIONS

This application is the National Phase of International Application PCT/US13/073958 filed Dec. 9, 2013 which designated the U.S. and that International Application was published in English under PCT Article 21(2) on Jun. 12, 2014 as International Publication Number WO 2014/089580A2. PCT/US13/073958 claims priority to U.S. Provisional Application No. 61/734,824filed Dec. 7, 2012. Thus, the subject nonprovisional application claims priority to U.S. Provisional Application No. 61/734,824 filed Dec. 7, 2012. The disclosures of both applications are incorporated herein by reference in their entirety.

BACKGROUND OF THE INVENTION

This invention relates in general to vehicle speed control devices that regulate a user-selected vehicle speed level and, in particular, to speed control devices having an off-road speed maintaining capability.

SUMMARY OF THE INVENTION

This invention relates to a vehicle speed control system, that in one embodiment is configured with off-road performance features, that will allow the driver to travel at a set speed in a smooth, controlled manner on various unmaintained surfaces without requiring the driver to press the brake or accelerator pedal.

The invention concerns a vehicle speed control system for maintaining vehicle speed at a base target speed when the control system is activated by a vehicle driver, the system comprising:

a slope sensor for directly or indirectly determining the slope of the ground on which the vehicle is traveling;

a speed sensor for directly or indirectly determining the vehicle speed;

an engine controller for generating an engine torque request signal to operate an engine/drivetrain so as to control the vehicle speed at an engine target speed;

a brake controller for generating a brake request signal to operate vehicle brakes so as to control the vehicle speed at a brake target speed;

wherein when the vehicle is traveling uphill the brake target speed is greater that the engine target speed and the base target speed corresponds to the engine target speed; and wherein the engine and brake controllers cooperate to maintain the vehicle speed at or near the base target speed.

Preferably, when the vehicle is traveling downhill the brake target speed is less than the engine target speed and the base target speed corresponds to the brake target speed. And, when the vehicle is at or near a level condition, the base target speed corresponds to the brake target speed. Optionally, the offset between the brake target speed and the engine target speed when the vehicle is traveling uphill increases with increasing steepness. As a further option, the engine controller may assume a passive operating state when the downhill slope exceeds a predetermined grade. The base target speed is selected by the vehicle driver.

As a separate and independent operating feature, the base target speed is a function of the slope on which the vehicle is traveling. As another separate and independent operating feature, the base target speed is a function of the steering angle.

Another separate and independent operating feature concerns that when the vehicle encounters an obstacle and the vehicle speed falls to or near zero, the system operates to increase engine torque so as to climb the obstacle; and wherein, at or near the time when the vehicle then begins to move (and the vehicle speed is still below the target speed), the vehicle braking is increased to preload the brake system prior to the vehicle speed reaching the target speed.

Another separate and independent operating feature concerns that when the vehicle it traveling uphill and the driver requests braking, the engine controller continues to generate the engine torque request signal until the driver's braking pressure reaches a predetermined level which is a function of the steepness of the slope.

Another separate and independent operating feature includes a driver operable terrain switch for selecting an operating mode generally corresponding to a ground surface to be traversed (e.g., auto, rock, sand, mud, etc.); and wherein the engine controller operates at an adjustable engine gain for generating an engine torque request signal to operate an engine/drivetrain so as to control the vehicle speed at the target speed; wherein the brake controller operates at an adjustable braking gain for generating a brake request signal to operate vehicle brakes so as to control the vehicle speed at the target speed; and wherein at least one of the engine gain and braking gain is adjusted as a function of the terrain switch.

Another separate and independent operating feature concerns that when the vehicle speed is below the base target speed, the engine controller is operative to generate the engine torque request signal so as to increase engine torque to increase the vehicle speed to the base target speed; and wherein when the vehicle encounters an obstacle and the vehicle speed falls to or near zero, the system operates in a high torque mode for a certain time and then operates in reduced torque mode to at least temporarily reduce the engine torque.

Various aspects of this invention will become apparent to those skilled in the art from the following detailed description of the preferred embodiment, when read in light of the accompanying drawings.

BRIEF DESCRIPTION OF THE DRAWINGS

FIG. 6A is a graph of target speed as a function of slope.

FIG. 6B is a graph of target speed as a function of steering angle.

FIG. 6C is a graph of target speed offset between the SSC-B and SSC-E controllers.

FIG. 10A illustrates various stages of a vehicle traversing an obstacle.

FIG. 10B is a comparative plot of a brake pressure, open-loop request.

FIG. 10C are comparative plots of brake torque, engine torque, and vehicle speed for the obstacle traversing stages of FIG. 10A in accordance with the invention.

FIG. 11A is a schematic illustration of a vehicle on a surface having a slope of Θ.

FIG. 11B is a plot of brake pressure versus surface slope Θ.

FIG. 11C are comparative plots of brake torque, engine torque, and vehicle speed for the vehicle of FIG. 11A in accordance with the invention.

DETAILED DESCRIPTION OF THE PREFERRED EMBODIMENT

Figure 1:
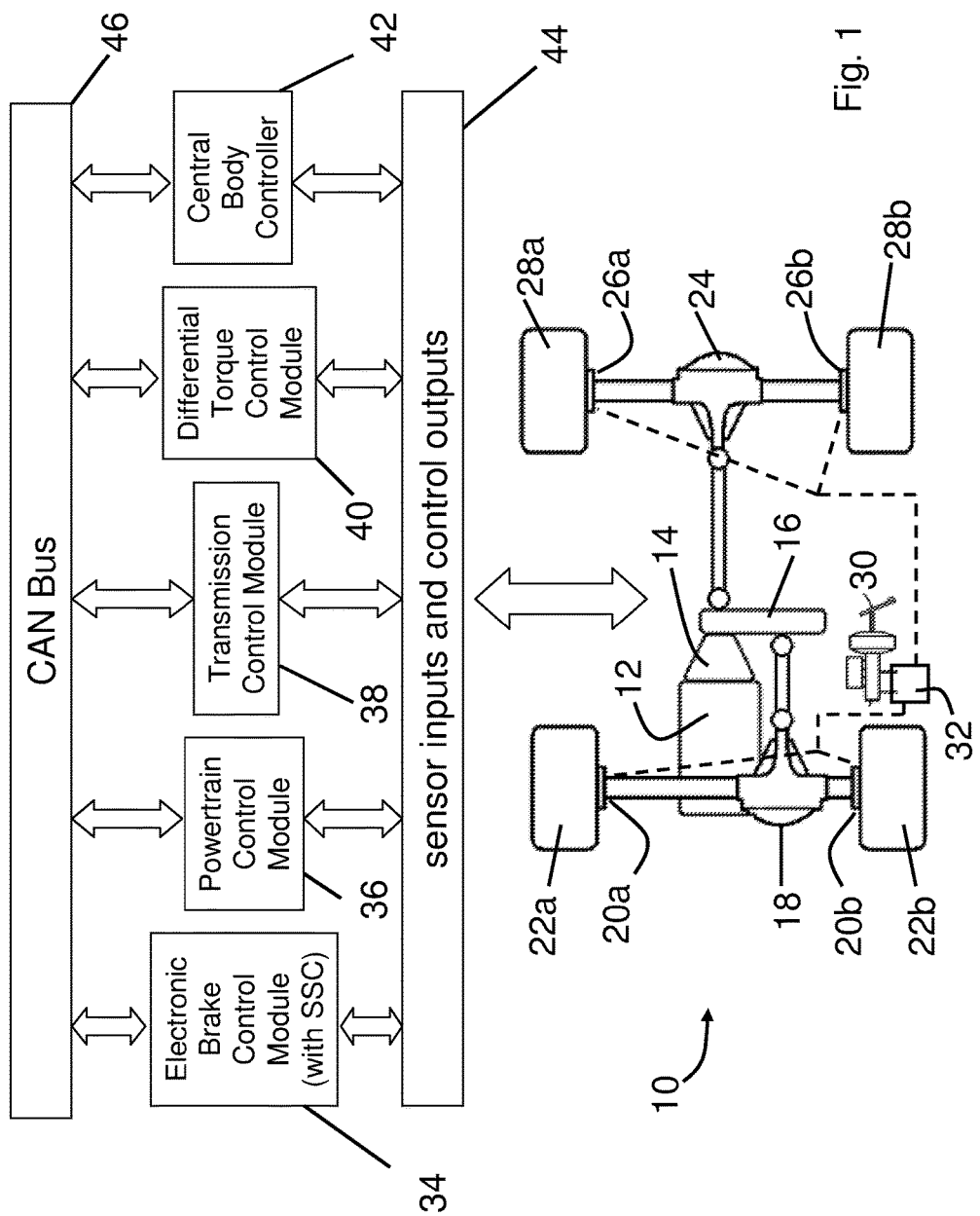
FIG. 1 illustrates a 4WD vehicular configuration which may used to implement the Select Speed Control features of the invention.

To facilitate this description, the following acronyms and definitions may be used:

| Acronym/Term | Full Form/Definition |
| --- | --- |
| CAN | Controlled Area Network |
| CBC | Central Body Control Module |
| ELSD | Electronic-Limited Slip Differential |
| EBCM | Electronic Brake Control Module |
| HDC | Hill Descent Control |
| HMI | Human Machine Interface |
| PCM | Powertrain Control Module |
| TCM | Transmission Control Module |
| SSC | Select-Speed Control |
| SSC-B | Select-Speed Control Brake Controller |
| SSC-E | Select-Speed Control Engine Controller |

In one embodiment, the vehicle cruise control system is a Select Speed Control Function (SSC) configured for use in on- and off-road conditions. When fully activated, the SSC is adapted to maintain speed of the vehicle at a speed selected by the vehicle driver. While at least a portion of the operating principles of SSC described herein are advantageously used for low speed control applications, such as speeds up to about 10 KPH, at least some of the operating principles described herein may be adapted for use in higher speed applications such as those found in, e.g., autonomous cruise control (ACC) systems. Preferably, the SSC system is adapted for use in a vehicle 10 of the type shown in FIG. 1. In particular, the vehicle may be equipped with the following hardware components:

an engine 12
a transmission 14
a four wheel drive (4WD) system, or transfer case 16, with a high numerical drive ratio, conventionally termed "4-Low"
a front differential 18 connected to front brakes 20a, 20b and front wheels 22a, 22b
a rear differential 24 (which is typically an electronic locking differential or "E-Locker") connected to rear brakes 26a, 26b and rear wheels 28a, 28b
a brake system including a brake pedal 30 operable by the vehicle driver to selectively actuate the vehicle brakes
an electronically controlled vehicle stability/traction control/anti-lock brake unit 32 interposed between the brake pedal and the vehicle brakes 20a,b and 26a,b.

Figure 2:
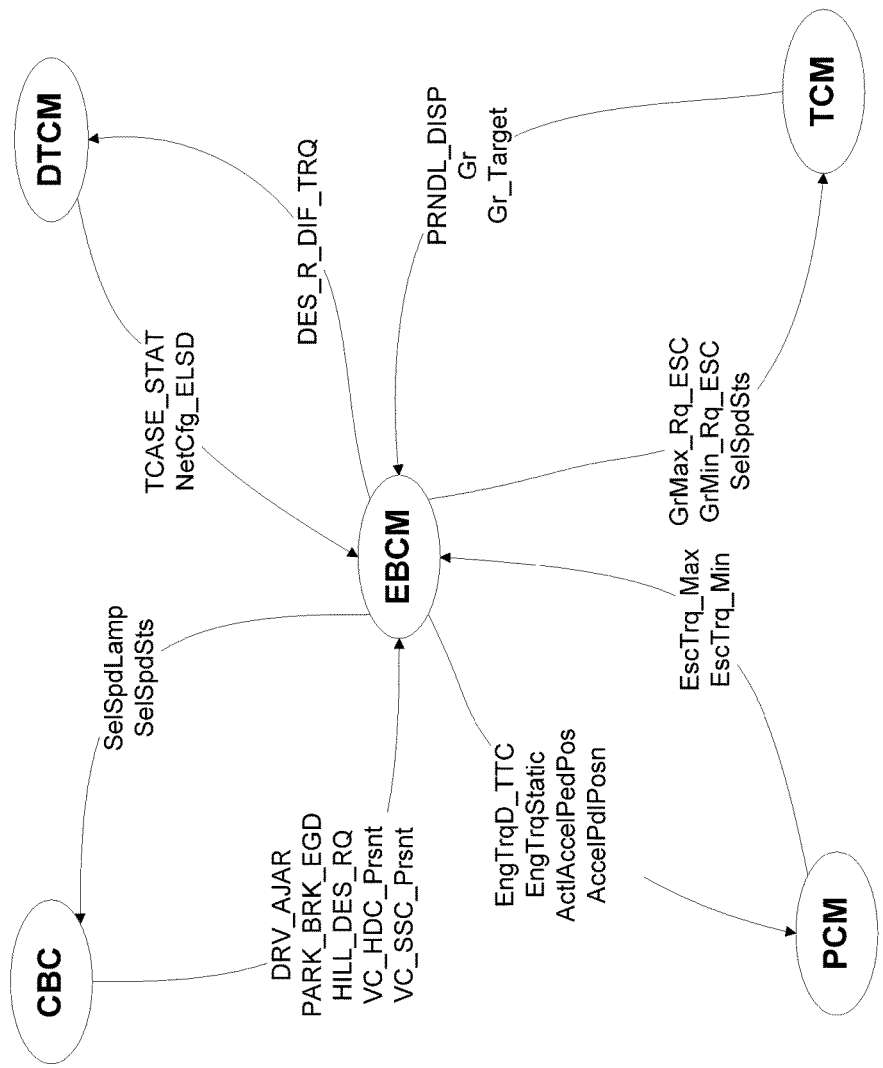
FIG. 2 is CAN interface architecture diagram for Select Speed Control system.

FIG. 1 also shows a series of control modules including an Electronic Brake Control Module (with the Select Speed Control) 34, a Powertrain Control Module (PCM) 36, a Transmission Control Module (TCM) 38, a Differential Torque Control Module (DTCM) 40, and a Central Body Controller (CBC) 42. As represented by a block 44, each of these modules is adapted to receive various sensor inputs from the vehicle, and generate selected control outputs to various electronically controlled components. The various modules are further adapted to communicate with one via a CAN bus 46. The Powertrain (or Engine) Control Module (PCM) 36 is preferably configured to perform one or more of the following functions:

honor the torque request from the EBCM 34 for an indefinite amount of time
populate instantaneous engine torque on a controlled area network (CAN) bus 46
populate the driver requested torque signal on the CAN bus that outputs idle control torque request during idle control
receiving and discerning actual accelerator pedal position The EBCM 34, which includes Electronic Stability Control functionality, receives one or more of the following sensor inputs (sensors and inputs represented in part by block 44):

wheel speed sensors (single or bi-directional)
an accelerometer
a steering angle sensor
master cylinder pressure sensor The TCM 38 provides the following functionality for the automatic transmission 14:

Functionality to upper limit the maximum gear of the transmission with EBCM request capability in a system-enabled (SSC_ENABLED) state
Functionality to lower limit the minimum gear of the transmission with EBCM request capability in the SSC_ENABLED State
ERS functionality supported by the transmission The CBC 42 operates to provide the following functionality:

human-machine interface (HMI) for selecting target speed
HMI for displaying selected speed target
Lamp on the instrument panel for notifying the status of the SSC system based the SelSpdLamp message output by the EBCM module
3-Level Compliant Driver Door Status message available on CAN Bus
Parking Brake with CAN communication of status Referring to FIG. 2, there is illustrated a CAN interface architecture diagram for the SSC system depicting the flow of communication between various modules and the CAN messages supported by the system. As shown, the electronic brake control module (EBCM) may control/communicate with the vehicle powertrain (PCM), transmission (TCM), drivetrain (DTCM), and the central body control (CBC) during Select Speed Control unless the driver overrides through the use of the brakes, throttle, or disabling of the system.

The EBCM, which is the driver of the SSC function, may output CAN messages, shown in Table 1 below, to various modules to modulate the engine torque, transmission gear, lamp handling, and the coupling of the rear differential to control the vehicle to the driver set target speed in a smooth manner while optimizing vehicle performance based on the driver selected terrain.

TABLE 1

| Signal Name | Units | Receiver | Definition |
| --- | --- | --- | --- |
| EBCM CAN Output Definitions for Select Speed Control | | | |
| SelSpdSts | Boolean | CBC, TCM | Status of the select speed system.<br>"1" defines the system as "ON" and available to the driver to modulate engine torque<br>"0" defines the system as "OFF" and unavailable to the driver |
| SelSpdLmp | State | CBC | The command to illuminate the Select-Speed Lamp on the instrument cluster and the Select-Speed Switch<br>"00" Defines the system as "OFF" and both the instrument cluster lamp and the SSC Switch will not be illuminated<br>"01" Defines the system as "ON" and both the instrument cluster lamp and the SSC Switch will be illuminated continuously<br>"10" Defines the system in an unavailable state due to entry conditions or operating conditions are not satisfied and the system will transition or remain in the "OFF" state, the lamp will blink during this command<br>"11" Defined by the feature not being supported, SNA |
| EngTrq_Rq_ESC | Nm | PCM | The signal is defined as the torque request from the EBCM module during the SSC "ON" state. This is signal is also utilized by other torque functions from the EBCM module such as TC, YSC, EDTR, and MSR. The signal will be defined as the SSC-E requested torque when the SSC is in the "ON" state to keep the vehicle traveling at the driver set target speed.<br>When SSC-E is NOT actively requesting engine torque due to a driver throttle override or brake override the signal will feedback the EngTrqStatic signal to the PCM. |
| EngTrqMax_Rq_ESC | Boolean | PCM | The signal is defined as TRUE when the EBCM module is requesting a torque increase from the PCM, and FALSE when the EBCM module is not requesting a torque increase from the PCM.<br>In one embodiment, the signal is equal to "1" when the SSC-E torque request is greater than the EngTrqD_TTC signal<br>* NOTE: In other embodiments, the implementation may not be followed because the EngTrqD_TTC message will output the effective torque based on the EBCM module request. Therefore, the above-mentioned strategy for detecting driver throttle override may not be supported by the specific architecture. Thus, the PCM module will supply a driver override signal and arbitrate control internally. This is the same strategy as ACC.<br>Signal is equal to "0" when the SSC-E torque request is less than or equal to the EngTrqD_TTC signal. The engine is not to honor the EngTrq_Rq_ESC. |
| GrMax_Rq_ESC | Gear | TCM | The signal is defined as the upper gear limit of the transmission during SSC control<br>"PASSIVE" is defined as NO upper gear limit request by the ESP module during a driver override event<br>"G1" is defined as an upper gear limit of "1" during when the SSC feature is actively requesting engine torque in a forward driven gear<br>"G2" is defined as an upper gear limit when the SSC-E is in the "OFF" state and SSC-B is "ON" during downhill control |
| DES_R_DIFF_TRQ | Nm | DTCM | The signal is defined as the rear differential coupling request from the EBCM module.<br>During SSC control the rear differential is desired to be coupled as a function of steering, inclination, and terrain select mode. The value should be calibrated to optimize off road performance. |

The central body control module (CBC) may output the following CAN messages, shown in Table 2 below, to the EBCM for use in the SSC subsystem.

TABLE 2

CBC CAN Output Definitions for Select Speed Control

| Signal Name | Units | Receiver | Definition |
|---|---|---|---|
| VC_HDC_Prsnt | Boolean | EBCM | "1" the vehicle is configured to have HDC functionality. Only brake control is available<br>"0" the HDC function is not supported on the vehicle |
| VC_SSC_Prsnt | Boolean | EBCM | "1" the vehicle is configured to be an SSC vehicle (SSC-B and SSC-E control are available to the driver)<br>"0" the SSC feature is not supported in the vehicle |
| HILL_DES_RQ | Boolean | EBCM | "1" the driver is pressing the HDC/SSC button to enable or disable the system<br>"0" the driver is not currently pressing the HDS/SSC button |
| DRV_AJAR | Boolean | EBCM | "1" the driver door is ajar<br>"0" the driver door is closed |
| PARK_BRK_EGD | Boolean | EBCM | "1" the park brake is engaged<br>"0" the park brake is not engaged |

The powertrain control module (PCM) may communicate the following CAN messages, shown in Table 3 below, to the EBCM to assist in the operation of the SSC function.

TABLE 3

PCM CAN Output Definitions for Select Speed Control

| Signal Name | Units | Receiver | Definition |
|---|---|---|---|
| EngTrqD_TTC | Nm | EBCM | The signal outputs the driver demanded propulsion torque |
| EngTrqStatic | Nm | EBCM | The signal outputs the instantaneous torque output by the engine |
| AccelPdlPosn | % | EBCM | The signal outputs the virtual position of the pedal equivalent to the EngTrqD_TTC corresponding torque output. |
| ActlAccelPedPosn | % | EBCM (future) | The signal outputs the physical position of the accelerator pedal position |

The PCM interface may optionally include a driver override function to determine when the driver is overriding the SSC torque request, that is internal to the PCM, and may be configured to set the SSC engine torque request to the "PASSIVE" state within the EBCM. A driver override CAN message may be sent out by the PCM when the driver is overriding the SSC torque request, similar to the architecture of a conventional Adaptive Cruise Control (ACC). This configuration may provide a more robust implementation of the driver override detection because the PCM is responsible for the torque signals and the accelerator pedal position. Thus, internal detection of the necessary inputs would be more robust due to internal fail safes on the signals. In addition, this embodiment may further improve the HMI interface to the driver by displaying a message that the driver is overriding the SSC system on the cluster. In addition, the EngTrqD_TTC signal will mirror the SSC-E torque request when the SSC function is actively modulating the engine torque. Also, the AccelPdlPosn signal will calculate the virtual pedal based on the SSC torque request during SSC control.

The transmission control module (TCM) may output the following CAN messages to the EBCM for use in the operation of the SSC. During SSC control, the transmission module may be configured as a slave to the EBCM in order to maintain the proper gearing to optimize the off road performance and smoothness of the SSC-E and SSC-B controller. As shown in Table 4 below, the transmission control module (TCM) may provide one or more of the following outputs.

TABLE 4

TCM CAN Output Definitions for Select Speed Control

| Signal Name | Units | Receiver | Definition |
|---|---|---|---|
| PRNDL_DISP | Gear Position | EBCM | The signal outputs the PRNDL (Park, Reverse, Neutral, Drive, Low) position to the driver on the instrument cluster.<br>For SSC control, the ERS functionality will display the speed target (1-8, N, R) for SSC. |
| Gr | Gear | EBCM | The signal communicates the current gear of the transmission. |
| Gr_Target | Gear | EBCM | The signal communicates the target gear of the transmission. The delta between Gr_Target and Gr define a shifting condition of the transmission. |

The TCM may optionally default to a SSC specific transmission shift map when the SSC function is in the "ON" state. This configuration will allow the transmission to be calibrated specifically for SSC performance to eliminate the harshness associated with the handover between SSC and TCM control of the transmission during driver throttle override events. In addition, the speed target being limited as a function of grade is currently executed internally to the EBCM without informing the driver. Thus, as the vehicle climbs a steep hill, the speed target may be limited although the driver perceives that the PRNDL_DISP is the vehicle target speed. as a consequence, if the limited speed is slower than the driver desires, the driver may increase the target speed. In this embodiment, the EBCM may ignore the speed increase due to the internal grade speed limitation. As the driver crests the hill, the internal target speed will approach the driver selected target speed as a function of grade. This may result in the vehicle suddenly accelerating due to the change in target speed as a function of slope. As an alternative in this embodiment, a clean interface for this functionality may allow the EBCM to limit the PRNDL_DISP value based on the internal grade limitation and any other internal target speed limitations. A PRND_MAX messages can be implemented to overwrite the PRNDL_DISP gear as the target speed is limited by the EBCM. This will inform the driver of the internal modification of the target speed. Also, the PRNDL_DISP is normally not increased by the EBCM once the limitation condition no longer exists. In another variation of this embodiment, the driver may increase the target speed manually with paddles. This will improve the driver interface, and eliminate sudden accelerations as the driver crests a steep hill with a higher target speed than the internal grade limited target speed.

The drivetrain control module (DTCM) may be configured to output the following CAN messages, shown in Table 5 below, to the EBCM for use in the operation of the SSC function.

No EBCM faults are present
   AND
The driveline is confirmed in the low range, which will be confirmed by internal calculation when OEM verifies that the sending module of CAN status message is not a robust signal.
   AND
Driver is not applying the throttle
   AND
Vehicle speed is below a entry threshold [8 kph]
   AND
The PRNDL is confirmed in Park
   OR
Vehicle is in Neutral, Drive, or Reverse
   AND
Driver Door is not open
   AND
Park Brake is not engaged
   AND
HMI SSC Button is pressed The SSC ON state may include a number sub-states, including SSC ON-Active Brake, SSC ON-Active Engine and SSC On-Passive.

The status of the SSC-B controller is determined to be active when the controller is actively requesting brake pressure. The status of the brake controller does not need to be directly conveyed via the CAN Bus during control with a unique message; however, the BrkTrq message outputs the estimated BrkTrq requested by the EBCM module. In this embodiment, the SSC-B controller may be active under one or more (including all) of the following conditions:

SSC ON State present
   AND

TABLE 5

DTCM CAN Output Definitions for Select Speed Control

| Signal Name | Units | Receiver | Definition |
| --- | --- | --- | --- |
| TCASE_STAT | State | EBCM | The signal will output the status of the transfer case and communicate whether the drive train in the 4Low state for SSC to activate.<br>*Note: This signal can be validated with an internal plausibility diagnostic. |
| NetCfg_ELSD | Boolean | EBCM | The signal will output whether the rear differential is present on the vehicle and active. This is a robustness check because the SSC system may typically not function without a functional rear differential on the vehicle. |

In operation, the Select Speed Control (SSC) function may be defined to have two states: ON and OFF. The states can be communicated to other vehicle modules through the use of the SelSpdSts message.

Under the CAN Protocol, when SelSpdSts=1, the SSC function is ON. The SSC function is ON when the function has been enabled by the driver and the Selec-Speed Brake Control Brake Controller (SSC-B) and Selec-Speed Control Engine Controller (SSC-E) are readily available to control their respective outputs to maintain the driver selected target speed. To the driver this state is represented by a continuously illuminated SSC lamp. It is noted that the SSC ON state does not need to contain any specific information on the status of individual SSC-E and SSC-B controllers. It may, however, be configured to convey that the SSC-B and SSC-E are available to the other modulates. In this embodiment, the SSC system may be configured with the following SSC Function Enabling Criteria in the ON state:

-continued

Indicated gear selection is any forward gear selection (D or numeric value), Neutral, or Reverse
   AND
Vehicle speed is below a tunable threshold (first trial 20mph)
   AND
Brake pressure is requested by SSC-B controller
   AND
Driver is not braking greater than the SSC-B request The status of the SSC-E controller is determined to be active when the SSC-E torque request (EngTrq_Rq_ESC) is greater than the driver requested torque (EngTrqD_TTC). The SSC ON-Active Engine state is present when the EngTrqMax_Rq_ESC is "1". In this embodiment, the SSC-E controller may be activate under one or more (including all) of the following conditions:

SSC ON State is present
AND
Indicated gear selection is any forward gear selection (D or numeric value), or Reverse
AND
SSC-E torque request is greater than Driver Requested Torque (EngTrqD_TTC)
AND
Vehicle is on slope greater than tunable threshold (−15%)
AND
Driver braking input is below a threshold The SSC system may have one or more (including all) portions set to a passive state, indicated as SSC ON-PASSIVE. In this state, the SSC function has been enabled by the driver, and neither, the SSC-B or the SSC-E is actively controlling the related subsystems. In this embodiment, the SSC-E and SSC-B controllers may be set to a passive state, while remaining available when one or more (including all) of the following conditions are present:

Vehicle speed exceeds a tunable threshold (first trial 20 mph)
OR
Vehicle is shifted to Park (P)
OR
SSC-E torque request is less than driver requested torque ((EngTrqD_TTC)
AND
SSC-B is passive.

The status or indicator lamp is configured to signal to a driver to a condition of the operative SSC state. The lamp may be configured to indicate the SSC-ON State as follows: In the SSC ON-PASSIVE state, when the vehicle is over a predetermined speed (e.g., 20 mph) the lamp will flash for a certain time period (e.g., a maximum of 70 seconds) and then automatically disable. In addition, during this flash condition when the driver presses the HMI button or the vehicle speed exceeds a second higher predetermined speed (e.g., 40 mph), the lamp will cease to be illuminated and SSC will transition to the SSC-OFF State. Other lamp signaling architectures may also be used to indicate the SSC state, if desired. In a specific embodiment, shown below in Table 6, the lamp signaling conditions may operate under one or more (including all) of the conditions indicated:

Under the CAN Protocol, when SelSpdSts=0, the SSC function is OFF. The SSC OFF state is defined as by the following conditions: the Selec-Speed function is not enabled, and the SSC-B and SSC-E controllers are inhibited from modulating their respective control outputs. To the driver, this state is represented by a non-illuminated SSC lamp. The SSC OFF state can be present in the following scenarios:

- the driver has not enabled the SSC function.
- the driver presses the HMI button when the system is not current enabled and not all the SSC entry conditions are satisfied. The lamp may flash for a minimum of 2 seconds and a maximum of 5 seconds.

In addition, the transition from the SSC ON-ACTIVE to the SSC OFF state will occur in a controlled manner with a flashing lamp for a minimum of 2 seconds based on the following conditions:

The driveline is no longer confirmed in the low range
OR
The driver door is opened
OR
An EBCM fault is detected
OR
The park brake is engaged.

The SSC function can transition from the SSC ON-ACTIVE to the SSC OFF state when the system is currently enabled and the HMI button is pressed with no flashing of the lamp. The SSC function can transition from the SSC ON-PASSIVE to the SSC OFF state when one or more of the following conditions are present:

The driver presses the HMI Button
OR
The vehicle speed is greater than 20 mph for 70 seconds
OR
The vehicle speed is greater than 40 mph As shown below in Table 7, the lamp actions associated with SCC OFF state transitions and conditions are presented.

TABLE 6

SSC-ON State Lamp Handling

| SSC ON State | Conditions | Lamp Action |
|---|---|---|
| SSC ON-ACTIVE BRAKE | See above | Solid Lamp |
| SSC ON-ACTIVE ENGINE | See above | Solid Lamp |
| SSC ON-PASSIVE due to driver brake or throttle override | Vehicle is shifted to P OR SSC-E torque request is less than driver requested torque (add signal) AND SSC-B is passive | Solid Lamp |
| SSC ON-PASSIVE Over Speed Warning | Vehicle speed exceeds a tunable threshold (first trial 20 mph) | Flash Lamp for maximum of 70 seconds |

TABLE 7

SSC-OFF State Lamp Handling

| SS-C State Transition | Conditions | Lamp Action |
|---|---|---|
| SSC OFF | The system has not been enabled by driver | No lamp |
| SSC ON -> OFF Transition by Driver Request | The driver presses the SSC HMI button AND The driveline is confirmed in the low range AND The driver door is closed AND The vehicle speed is below 20 mph AND No EBCM fault is present AND The park brake is not engaged | Solidly Illuminated Lamp |
| SSC ON-Passive -Over Speed -> OFF Transition by Driver Request | The driver presses the SSC HMI button AND The vehicle speed is above 20 mph | No Lamp Immediately |
| SSC ON-Passive -Over Speed -> OFF Transition by Max Over Speed Timer | The vehicle speed is above 20 mph for 70 seconds | No Lamp Immediately |
| SSC ON-Passive -Over Speed -> OFF Transition by Maximum Speed | The vehicle speed is above 40 mph | No Lamp Immediately |
| SSC ON -> OFF Transition by Invalid Condition | The driveline is no longer confirmed in the low range OR The driver opens the driver door OR An EBCM fault is detected OR The park brake is engaged OR Thermal Fault | 5 Second Lamp Flash **Note: If the conditions causing the transition to the OFF are satisfied during the flash, the flash should timeout with a minimum time of 1 second **Note: If driver presses the button during the flash, the flash is immediately cancelled |
| SSC OFF -> OFF Transition by Invalid Condition | HMI button is pressed AND The driveline is no longer confirmed in the low range OR The driver opens the driver door OR An EBCM fault is detected OR The park brake is engaged | 5 Second Lamp Flash **Note: If the conditions causing the transition to the OFF are satisfied during the flash, the flash should timeout with a minimum time of 1 second **Note: If driver presses the button during the flash, the flash is immediately cancelled |

Figure 3:
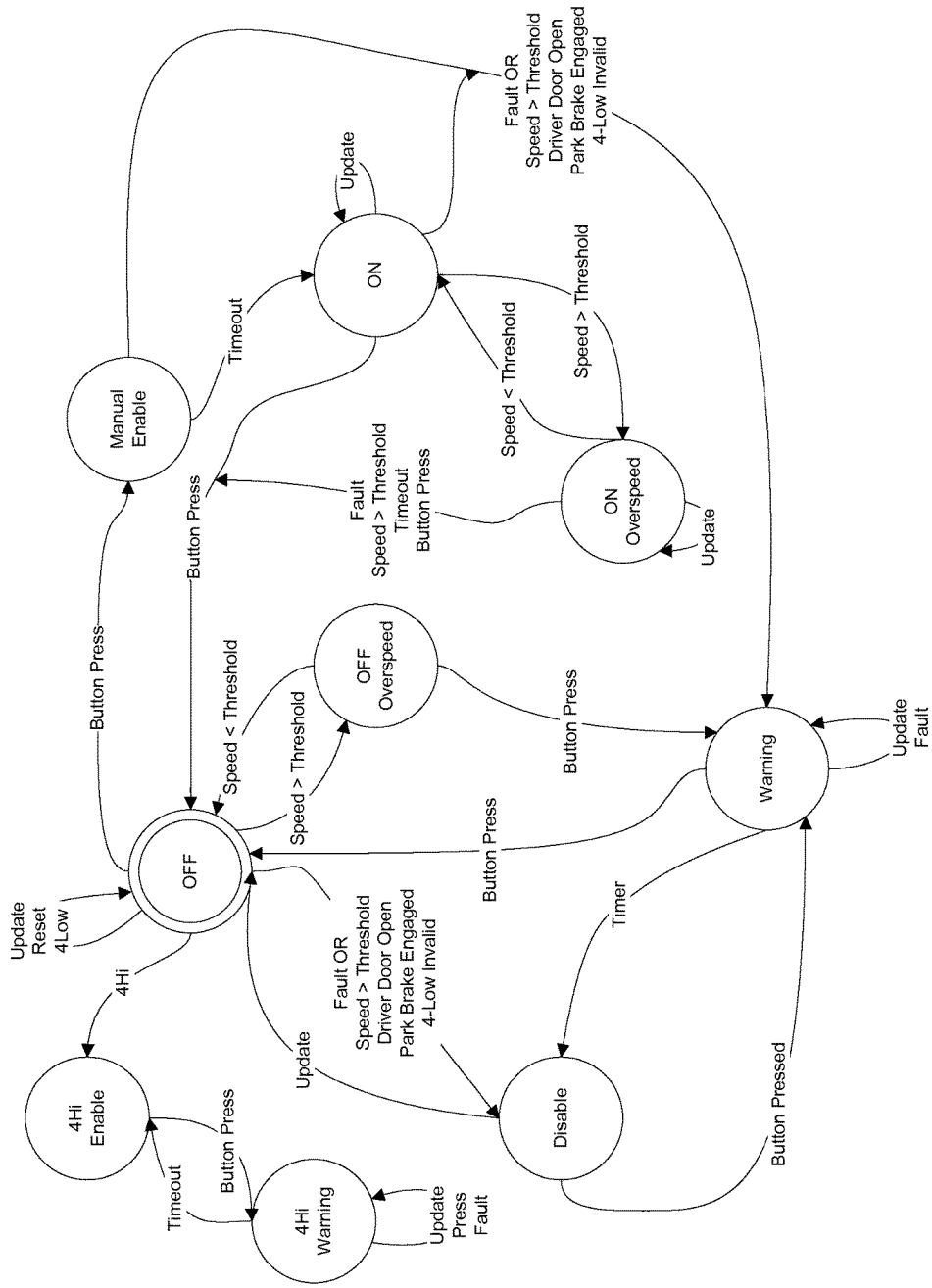
FIG. 3 is a mode input/output diagram of the Select Speed Control system.

Referring to FIG. 3, the moding of the SSC function is graphically depicted.

Figure 4:
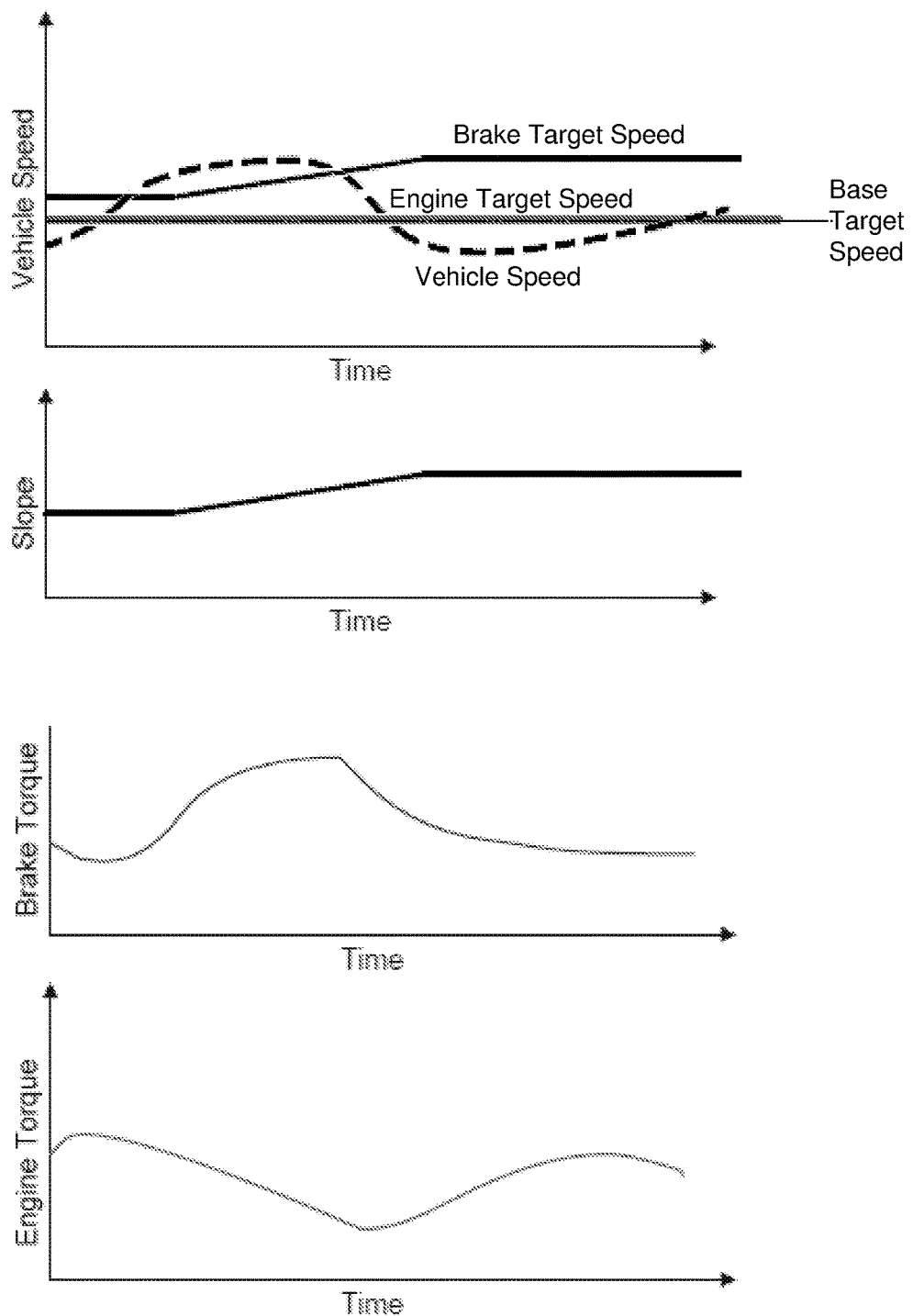
FIG. 4 illustrates the control strategy at a constant base target speed.
Figure 5:
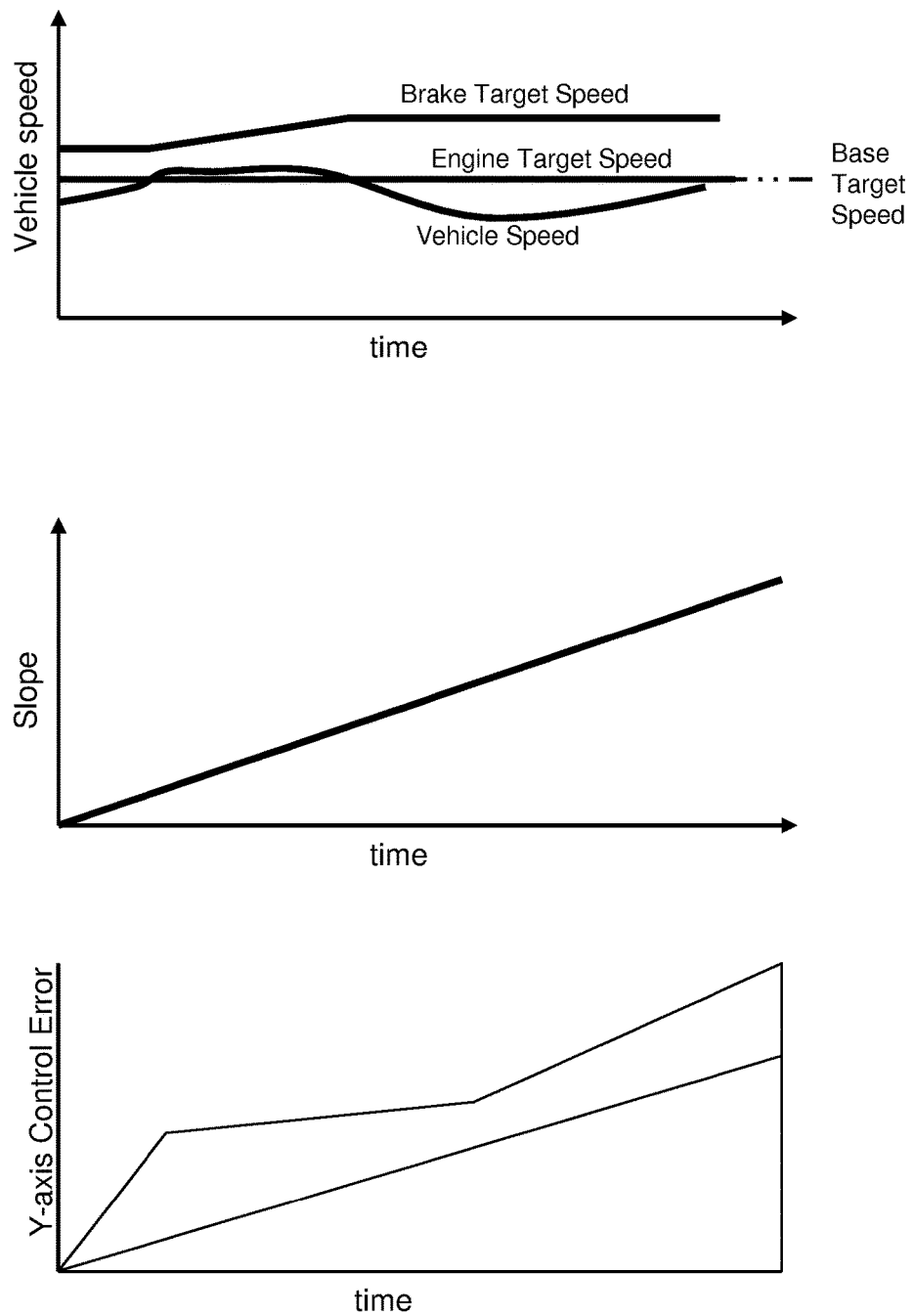
FIG. 5 shows various SSC engine controller summary graphs.

If a Hill Descent Control (HDC) feature is contained within the EBCM, the SSC system can be considered an extension of the HDC. Typically, the HDC system is designed to work on downhill slopes greater than a threshold, and it automatically modulates the brake pressure to control the vehicle speed to a driver set target speed while descending a hill. Gravity and idle torque, when the driveline is engaged, are the forces propelling the vehicle downhill. The HDC brake controller is referred to as SSC-B in the context of the Select Speed Control subsystem. The SSC system is composed of two concurrently running controllers that will modulate brake pressure and engine torque separately to maintain the driver selected target speed. The Select Speed Control engine controller is herein referred to as SSC-E. The SSC-E controller may be contained in the EBCM, and request the necessary torque for the vehicle to maintain the driver selected target speed in a slow, controlled manner when the vehicle is on a slope greater than a threshold. The control strategy at a constant base target speed is illustrated in FIG. 4.

In addition to control of the brake and engine torque, the SSC function can use the gear selector (PRNDL) display to determine the driver set target speed with various internal modifications, control the maximum gear of the transmission, and the coupling status of the E-Locker when SSC is in the "ON" state.

The SSC-B controller can be configured to provide an HDC function that modulates the brake pressure to maintain the driver selected target speed as the vehicle travels down a slope steeper than a threshold. When the controller is configured as part of the SSC subsystem, the conditions may be modified to allow the SSC-B controller to modulate the brake pressure on all slopes. Thus, the SSC-B controller may be readily available once the driver has enabled the function through the HMI, independent of grade. The controller allows the driver to overlay a brake request and seamlessly take control of vehicle braking. In addition, any throttle override input by the driver will result in a ramp out of the brake pressure. In order to optimize performance of the SSC function, the SSC-B controller can use the information from a Terrain Select dial to modify control and/or calibrations for the driver selected surface. Any alternative or specific Hill Descent Control algorithm may be the foundation for the SSC-B.

Optionally, an SSC Rock Mode Brake Controller may be provided to address specific driving conditions or terrain. When a driver selects the Rock Mode, it may be assumed that the driver is on a surface such as a rock garden, or boulders. In order to minimize overshoots of the SSC control, an open loop term is added to the SSC-B controller to emulate two foot driving.

The SSC-E controller modulates the torque request to the engine control module. The activation of the SSC-E controller may be inhibited when the vehicle is traveling down a slope steeper than a threshold (e.g., 15%). On a slope steeper than the threshold, SSC-E is set to the passive state because gravity and idle torque forces are sufficient for the vehicle to maintain the target speed. Under these conditions, the vehicle functions only with the SSC-B controller. The SSC-E controller is a PI controller with an open loop term. The input to the SSC-E controller is the error between the target speed and the vehicle speed. The equation for the controller is:

$$Y = [K_i \int e(t)dt + I\_Hill(grade)] + K_p e(t)$$

Where,
 $K_i \int e(t)dt$: speed error integrated over time multiplied by a gain factor ($K_i$)
 I_Hill: is equivalent to the torque required to hold the vehicle stationary on the estimated slope
 $K_p e(t)$: the proportional control error multiplied by a gain factor ($K_p$)

The open loop term referred to as the I_Hill term is defined as the minimum engine torque necessary to hold the vehicle stationary on the slope with no brake pressure in the system. In this embodiment, the I term is the dominant term in the controller for the vehicle to maintain the driver selected target speed, and is subject to gain scheduling based on the vehicle speed target. In addition, the SSC-E control output should initialize to the feedback torque by pre-loading the I term when the SSC-E activation conditions are met. A graphical summary of the SSC-E control is shown in FIG. 4.

The SSC-E controller is defined as being active when the SSC-E torque request is greater than the driver requested torque, the drive is not braking above a threshold, and the driveline is in a forward driven gear or reverse. This activation condition allows seamless driver torque overlay as the SSC-E controller transitions from the active to passive state. These transitions require the pre-loading of the I-term to maintain smooth control following a driver throttle or brake override of the system. To optimize the performance of the SSC function, it may be beneficial to permit the ability to gain the controller for each of the surfaces available on the Terrain Select dial.

Timeout logic of the SSC-E torque request may be implemented in order to protect the driveline from harm due to high torque requests by the SSC-E controller. Once an undesired situation due to the SSC-E torque request is determined, the SSC-E controller must reset to the torque request equivalent to the I Hill torque for 3 seconds; then the controller may reinitialize to the active state. The reset mechanism to the I Hill torque is beneficial because the limits can be reached on steep slopes and resetting to idle torque (the SSC-E Passive State) will result in significant roll back of the vehicle. The undesired torque requests are determine by the following checks:

The SSC-E can only request torque above a maximum torque (e.g., 240 Nm) threshold for a predetermined time (e.g., 2.5 seconds) when the vehicle is stationary.

The SSC-E can only request torque above a maximum torque (e.g., 240 Nm) threshold for a predetermined time (e.g., 3 seconds) when the vehicle is moving.

The Traction Control system brake limited differential brake request has reached the maximum request for a predetermined time (e.g., 1.5 seconds).

The rear axle is coupled and in a slip condition above a threshold rate for a predetermined time (e.g., 0.75 seconds). The addition of more torque will only increase the slip condition resulting in harm to the driver or driveline; if the tires were to gain traction at the high torque level (commonly seen on sand and loose dirt surface)

The driver selected target speed is the base target speed that the SSC-E and SSC-B controllers control to; however, there are several influences that can modify the SSC-E and SSC-B target speed. Referring to Table 8 below, and FIG. 6A, the target speed influences are:

PRNDL display on EVIC—the selected PRNDL position will determine the base target speed (See Table 8)
 Slope—the control target speed is upper limited on high slopes independent of the driver selected target speed (see Table 8)

TABLE 8

Select Speed Control Target Speed as Function of PRNDL and Grade

| Gear | Target Speed in KPH for grade < 15% | Target Speed in KPH for 100% grade |
|---|---|---|
| P | n/a | n/a |
| R | 1 | 1 |
| N | 2 (HDC functionality only) | 1 |
| D | If D is supported and D is selected during SSC entry target is 1 kph. If SSC is enabled before shifting to D, the speed target for D will be carried over to match the previously selected target. | 1 |
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |

In another embodiment, a steering wheel angle is measured and inputted into the system. To prevent binding of the rear axle and crow hop, a high input of steering on a slope within an upper and lower limit will decrease the controller target speed to a maximum target speed. If the slope is outside the limits, no steering angle adjustment is performed on the base target speed. The input is the absolute value of the steering angle. Table 9 shows an embodiment of target speed limits as a function of steering angle and slope.

TABLE 9

Select-Speed Control Target Speed Limits as a Function of Steering Angle and Slope

| Steering Angle | Upper Speed Target Limit | Adjustment Band |
|---|---|---|
| 300 | 8 (Maximum Gear) | −15% < slope < 15% |
| 600 | 2 | −15% < slope < 15% |

It will be appreciated that the specific relationship between the driver selected target speed, slope and steering angle can vary depending on the specific vehicle operating characteristics.

In addition to the internal adjustments on the control speed target, the target speed of the SSC-E and SSC-B controllers are offset, as shown in FIG. 6C, to prevent wind-up of the two controllers. The SSC-E and SSC-B controllers are preferably prioritized as a function of downhill and uphill traveling conditions. Preferably, it can be advantageous to simultaneously operate both the engine and brake controllers over at least portion of the terrain being traversed. This is particularly desirable when the vehicle is traveling uphill, or when the vehicle is in certain operating modes such as on a ROCK terrain. However, during these portions of the control it is desirable to introduce an offset between the engine target speed and the brake target speed so as to prevent system windup of the two simultaneously operating controllers. When traveling uphill, it is preferable for the brake target speed to be greater than the engine target speed, and for the engine target speed to correspond to the base target speed. When traveling downhill, or when the vehicle is at or near level, it is preferable for the engine target speed to be greater than the brake target speed, and for the brake target speed to correspond to the base target speed. As shown in FIG. 6C, when traveling uphill the offset may increase with increasing slope. And, while the downhill offset is shown as being generally constant over the entire downhill range, in some instance it may be desirable to inhibit the SCS-E controller at a predetermined downward slope −x (e.g., −15%), such that its output corresponds to idle torque.

Figure 7:
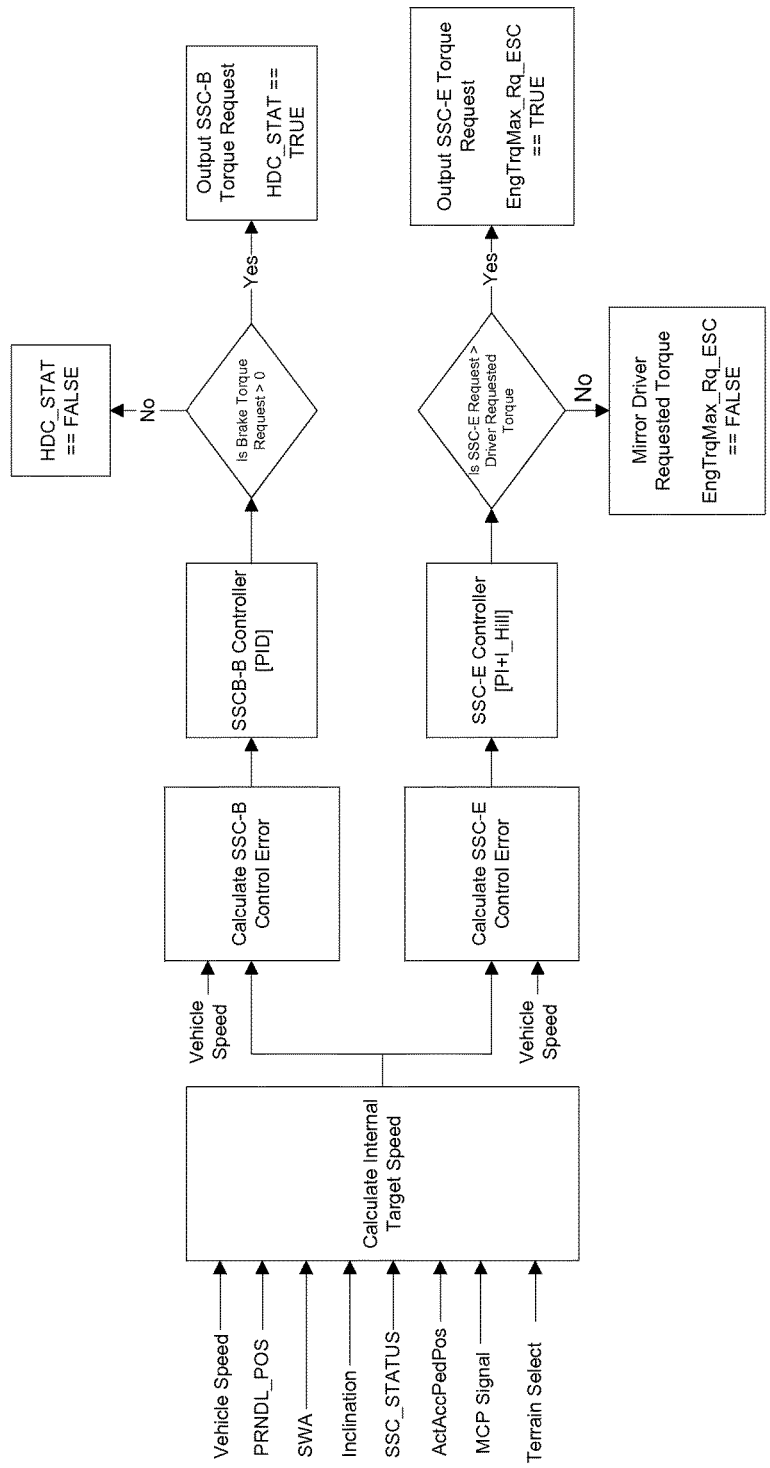
FIG. 7 is a flowchart of the speed target, SSC-B, and SSC-E operation.

Referring to FIG. 7, there is shown a flowchart representing the operation of the SSC-B and SSC-E controllers.

In one embodiment, the SSC function may be configured to request the maximum gear that the transmission can maintain during SSC ON control. The transmission may be configured to honor the request when the SSC function is enabled. Table 10, below, describes the implementation of the SSC gear request when the SSC function is enabled.

TABLE 10

Maximum Gear Logic for Select Speed Control

| Case | Gear Max. Request |
|---|---|
| SSC not enabled | PASSIVE |
| SSC Enabled Vehicle not in forward driven gear Engine control only | PASSIVE |
| Slope less than SSC-E activation threshold | 1 |
| Driver throttle override SSC-E Passive | 2 |
| Following driver throttle override vehicle above speed threshold | PASSIVE |
| Following driver throttle override vehicle below speed threshold calibrate for smooth handover from transmission control to SSC gear control | 1 |

Figure 8:
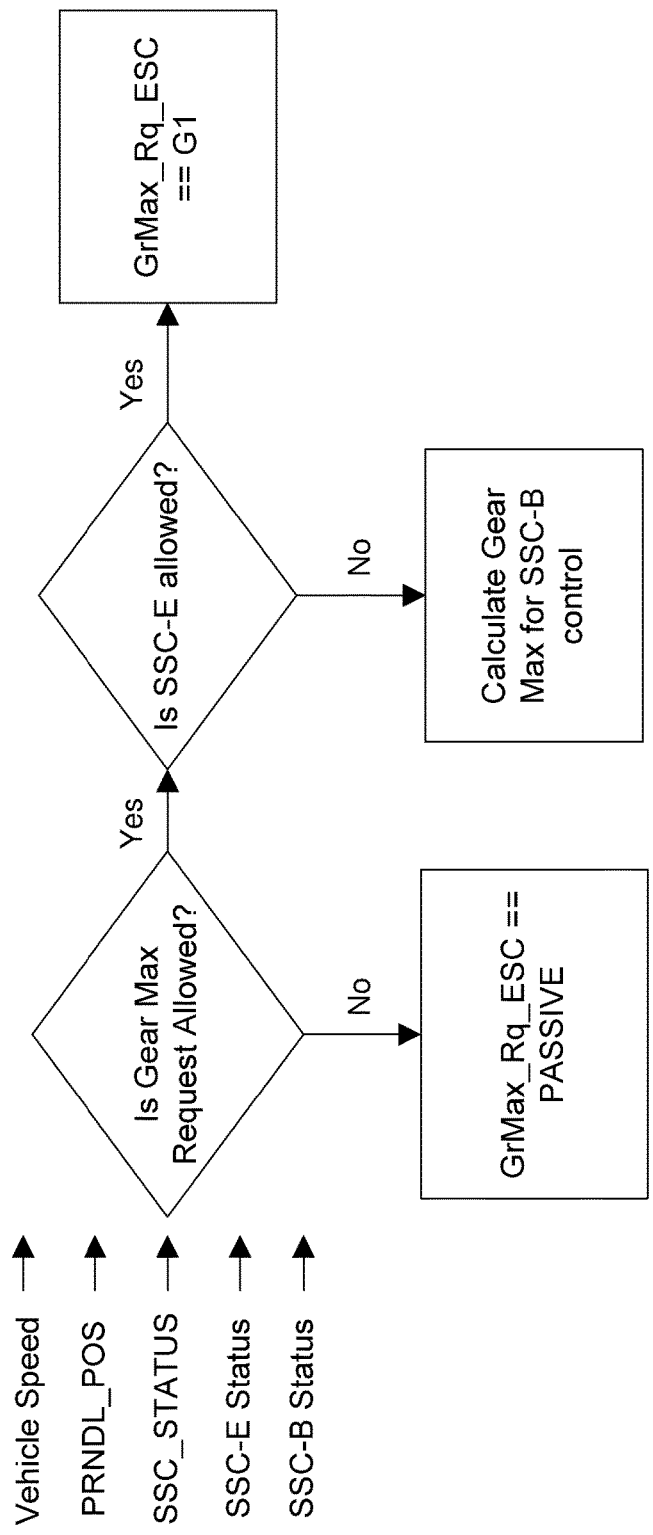
FIG. 8 is a flowchart of Select Speed Control Maximum Gear Logic.

In a variation of this embodiment, the SSC performance may be configured as a Transmission Shift Map with shifting biased toward higher RPM values to be used during SSC-control. This may eliminate any harsh handover of control of target gear position between the transmission and the EBCM following a driver throttle override event. Referring to FIG. 8, there is shown a flowchart of the maximum gear logic.

The E-Locker differential configured for implementation of SSC is an electronic limited slip differential. When SSC is in the "ON" state, a coupling request is sent to the ELSD as a function of the absolute value of the steering angle when the estimated slope of the surface is below a threshold predetermined threshold indicative of a relatively flat terrain such as, e.g., +/−15%. If the estimated slope is above this threshold, the ELSD is requested to couple with the maximum force (100%). This slope threshold is implemented to prevent crow hop and binding on flat ground with a large steering input. Table 11 below shows examples of the relationship between steering angle, coupling request and the slope.

TABLE 11

ELSD Control Look Up Table

| Steering Angle | Coupling Request in % | Slope |
|---|---|---|
| 300 degrees | 100 | −15% < slope < 15% |
| 500 degrees | 80 | −15% < slope < 15% |
| 620 degrees | 30 | −15% < slope < 15% |

Figure 9:
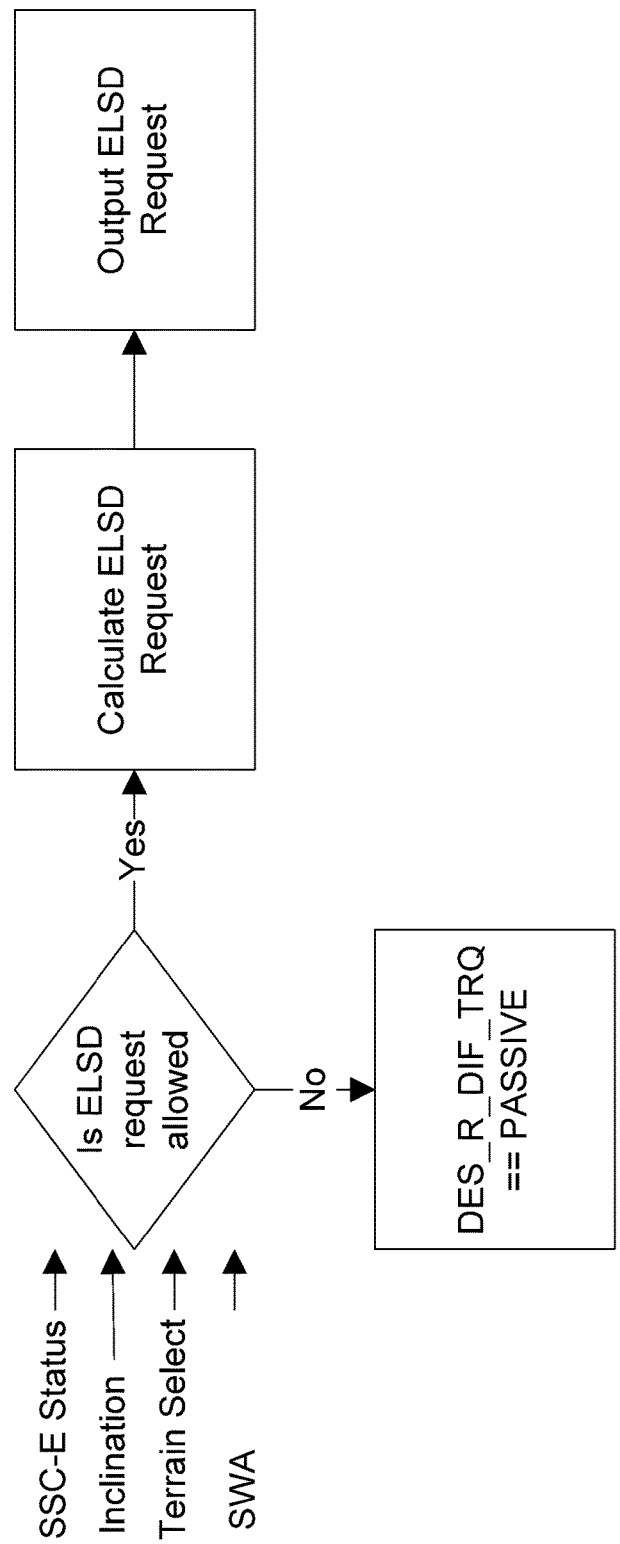
FIG. 9 is a flowchart of Select Speed Control Rear Differential Coupling Request Logic.

In a variation of this embodiment, the coupling request may only be allowed when the conditions are satisfied for SSC-E to enter the active state. The coupling request can also be tunable when the Select Terrain Dial is in the Rock position. This is done to maximize the performance of the vehicle by forcing the vehicle to remain a true 4-wheel-drive vehicle. Referring to FIG. 9, there is shown a flowchart of the logic associated with the rear differential coupling request.

Another variation of this embodiment configured for the interface with the rear differential, is to allow the rear differential to arbitrate between the EBCM coupling request and their desired coupling request. The current implementation makes the rear differential a slave to the EBCM; thus, the coupling is only performed by request. The rear differential, which has history with off road performance, can be limited to honor the EBCM request only when it is greater than their internal request.

Another feature of the SCS control is shown in FIGS. 10A-10C. FIG. 10A shows the vehicle traversing an obstacle 60 in stages A, B and C. FIG. 10B shows an brake open loop request 62 as a function of slope. FIG. 10C shows in solid lines the vehicle speed, engine torque and brake torque when using this feature of the invention, while the respective behavior without the invention is shown by dashed lines.

In FIG. 10A at stage A, the vehicle is traveling along a generally level surface and has encountered the obstacle 60. The obstacle causes the vehicle speed to drop to or near zero at time t0, as shown in FIG. 10C. At this point the engine torque is increased at 64 to cause the vehicle to being to move at time t1. According to one feature of the invention, at or near the time the vehicle being to move (time t1), the open loop brake request 62 is introduced at 66. As a result of the brake request 66, the vehicle speed is controlled so that any overshoot of vehicle at time t2 speed is reduced at 68. Without the brake torque increase at time t1, the brake response would be delayed, as shown at 70, such that the vehicle speed overshoot would be significantly higher, as shown at 72.

Another feature of the SSC control is illustrated by FIGS. 11A-11C. In FIG. 11A, the vehicle is shown as traveling upward on a hill with a slope of Θ, and acted on by a downward gravity force=mg (sin Θ). As long as the SSC remains active, the engine torque will be controlled to overcome this downward force, and maintain the vehicle speed as selected by the driver. In the event the driver steps on the brake, the engine torque request will be reduced as the brakes are applied. FIG. 11B shows the brake pressure necessary to hold the vehicle on a hill as a function of the slope Θ. Normally, on level ground and up to a slope of x0 (generally about 30%), and during a normal brake application of y0 (generally about 5-10 bar), the engine torque signal generated at idle is sufficient to prevent vehicle rollback. However, on slopes greater than x0, it may take increased brake pressure, as represented by the ramp 80. For example, at slope x1, a brake pressure of y1 is required to prevent vehicle rollback. Thus, in the event the driver depresses the brake pedal when the vehicle is traveling uphill, it is important that the engine torque request is not inhibited or reduced so quickly so as to cause the vehicle to roll back. The control feature illustrated in FIG. 11C ensures that sufficient brake pressure is generated in a steep uphill condition before the system allows the existing engine torque to be reduce to idle, by requiring the brake pressure reach a certain level before the engine torque is reduced.

FIG. 11C shows the vehicle speed, engine torque and brake torque as the driver applies the brake when SSC is active and the vehicle travels an uphill slope of x1. The solid lines represent the respective values when the enhanced control feature of the invention is used, while the dashed lines show the system response without this enhanced control feature. As shown in FIG. 11C, at time t0, the driver begins to press the brake pedal. Initially the engine torque remains applied. Then at time t1 brake pressure reaches y0, which is the minimum threshold pressure required to inhibit engine torque, as long as the measured slope is less than x0. According to this control feature, when the slope is greater than x0, the engine torque is not reduced at time t1, but remains applied or even slightly increased, as shown at 82. During this time the vehicle slows, as shown at 62. The engine torque remains elevated until time t2, which corresponds to the point when the driver applied brake torque reaches y2, which is the system pressure required to hold the vehicle stationary on the slope x2, with engine torque at idle. At time t2, engine torque is quickly reduced to idle torque, wherein the vehicle comes to a stop. Without this modified control strategy, the engine torque would normally be reduced beginning at time t1, and would reach idle torque before time t2. In this case, at 84, the vehicle would begin to roll backward for a short time period, before it would then come to a stop.

Figure 12A:
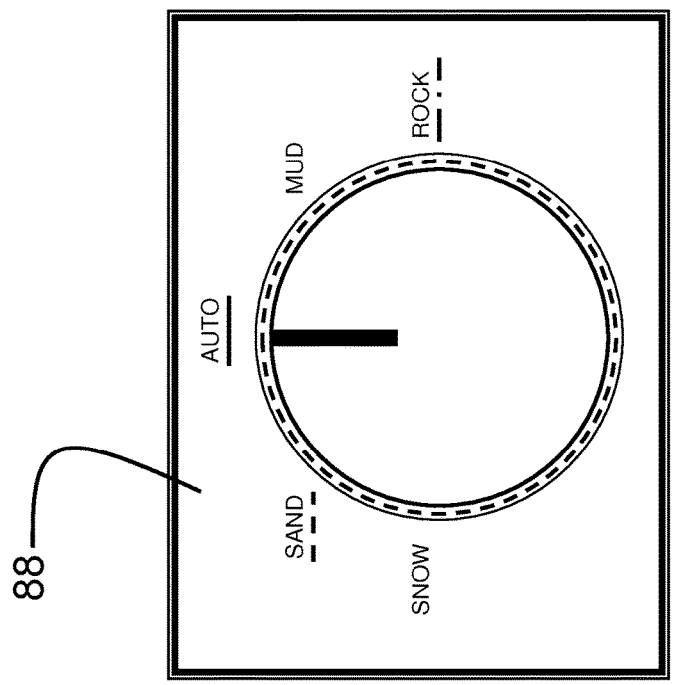
FIG. 12A is a schematic illustration of a terrain selection switch.
Figure 12B:
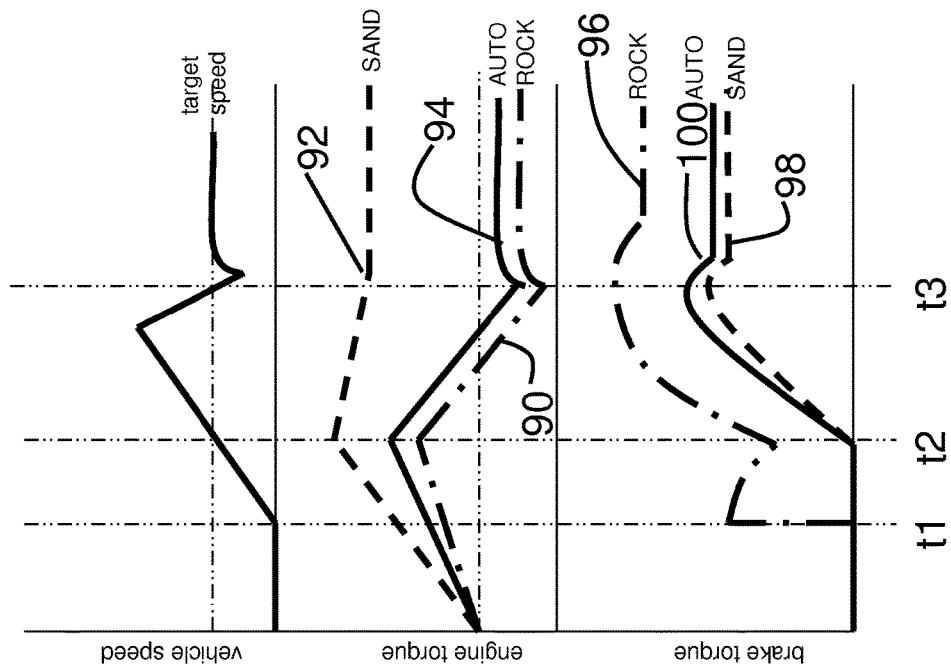
FIG. 12B are comparative plots of brake torque, engine torque, and vehicle speed for various settings and operating conditions in accordance with the terrain selector switch of FIG. 12A.

Another feature of the SSC system is illustrated in FIGS. 12A and 12B. According to this feature the gains of the SCS-B controller and the SCS-E controller are adjusted as a function of the position of the terrain select switch 88 shown in FIG. 12A. Generally when the switch is in the AUTO or SNOW positions the respective gains will be relatively moderate. However, when in ROCK mode, it can be advantageously to increase the gain of the engine controller, while reducing the gain of the brake controller. When in the SAND or MUD position, it is advantageous to increase the gain of the brake controller, and to decrease the gain of the engine controller.

As shown in FIG. 12B, depending on the particular terrain the vehicle is traveling, it is desirable to adjust the gain of controller to accommodate varying terrains. This is particularly important for the engine controller. For example, in a rocky terrain, a lower gain engine control is preferred (at 90), while in sand or mud conditions, a higher gain engine controller is preferred (at 92). For "auto" type settings, the engine controller gain can be set at a medium level (at 94). With respect to the brake controller, it is preferred that in a rocky terrain a high brake gain is selected (at 96). In sand or mud, a lower brake gain is preferred (at 98). For "auto" type settings, the brake controller gain can be set at a medium level (at 100).

In summary, the Select-Speed Control function optimizes off-road vehicle performance by modulating the engine and brakes autonomously while allowing the driver to concentrate on the path of vehicle with only steering as an input. The system provides the capability to ascend or descend any obstacle that a typical driver could navigate within the limits of the vehicle.

The principle and mode of operation of this invention have been explained and illustrated in its preferred embodiment. However, it must be understood that this invention may be practiced otherwise than as specifically explained and illustrated without departing from its spirit or scope. Additionally, each embodiment disclosed herein may be a stand alone component or combined with any or all of the other embodiments disclosed herein.

What is claimed is:

1. A vehicle speed control system for maintaining vehicle speed at a base target speed when the control system is activated by a vehicle driver, the system comprising:
   a slope sensor for directly or indirectly determining the slope of the ground on which the vehicle is traveling;
   a speed sensor for directly or indirectly determining the vehicle speed;
   an engine controller for generating an engine torque request signal to operate an engine/drivetrain so as to control the vehicle speed at an engine target speed;
   a brake controller for generating a brake request signal to operate vehicle brakes so as to control the vehicle speed at a brake target speed;
   wherein when the vehicle is traveling uphill the brake target speed is greater than the engine target speed and the base target speed corresponds to the engine target speed and when the vehicle is traveling downhill the brake target speed is less than the engine target speed and the base target speed corresponds to the brake target speed; and
   wherein the engine and brake controllers cooperate to maintain the vehicle speed at or near the base target speed.

2. The control system according to claim 1 wherein when the vehicle is at or near level the brake target speed is less than the engine target speed, and the base target speed corresponds to the brake target speed.

3. The control system according to claim 1 wherein an offset between the brake target speed and the engine target speed when the vehicle is traveling uphill increases with increasing steepness.

4. The control system according to claim 1 wherein the an offset between the brake target speed and the engine target speed when the vehicle is traveling downhill remains substantially constant with increasing steepness.

5. The control system according to claim 1 wherein the engine controller assumes a passive operating state when the downhill slope exceeds a predetermined grade.

6. The control system according to claim 1 wherein the base target speed is selected by the vehicle driver.

7. The control system according to claim 1 wherein the base target speed is a function of the slope on which the vehicle is traveling.

8. The control system according to claim 1 including a sensor for determining the angle of rotation of a steering wheel, and wherein the base target speed is a function of the steering angle.

9. The control system according to claim 1 wherein, when the vehicle encounters an obstacle and the vehicle speed falls to or near zero, the system operates to increase engine torque so as to climb the obstacle; and wherein, at or near the time when the vehicle then begins to move and the vehicle speed is still below the target speed, the vehicle braking is increased to preload the brake system prior to the vehicle speed reaching the target speed.

10. The control system according to claim 1 wherein, when the vehicle is traveling uphill and the driver requests braking, the engine controller continues to generate the engine torque request signal until the driver's braking pressure reaches a predetermined level which is a function the steepness of the slope.

11. The control system according to claim 1 and further including a driver operable terrain switch for selecting an operating mode generally corresponding to a ground surface to be traversed; and wherein the engine controller operates at an adjustable engine gain for generating an engine torque request signal to operate an engine/drivetrain so as to control the vehicle speed at the target speed;

wherein the brake controller operates at an adjustable braking gain for generating a brake request signal to operate vehicle brakes so as to control the vehicle speed at the target speed; and wherein at least one of the engine gain and braking gain is adjusted as a function of the terrain switch.

12. The control system according to claim 1 wherein when the vehicle speed is below the base target speed, the engine controller is operative to generate the engine torque request signal so as to increase engine torque to increase the vehicle speed to the base target speed; and wherein when the vehicle encounters an obstacle and the vehicle speed falls to or near zero, the system operates in a high torque mode for a certain time and then operates in reduced torque mode to at least temporarily reduce the engine torque.

13. The control system according to claim 11, wherein the operating mode includes at least one of an auto mode, a rock mode, a sand mode, and a mud mode.

14. A vehicle speed control system for maintaining vehicle speed at a base target speed when the control system is activated by a vehicle driver, the system comprising:

a slope sensor for directly or indirectly determining the slope of the ground on which the vehicle is traveling;

a speed sensor for directly or indirectly determining the vehicle speed;

an engine controller for generating an engine torque request signal to operate an engine/drivetrain so as to control the vehicle speed at an engine target speed;

a brake controller for generating a brake request signal to operate vehicle brakes so as to control the vehicle speed at a brake target speed;

wherein when the vehicle is traveling uphill the brake target speed is greater that the engine target speed and the base target speed corresponds to the engine target speed;

wherein when the vehicle encounters an obstacle and the vehicle speed falls to or near zero, the system operates to increase engine torque so as to climb the obstacle; and wherein, at or near the time when the vehicle then begins to move and the vehicle speed is still below the target speed, the vehicle braking is increased to preload the brake system prior to the vehicle speed reaching the target speed; and wherein the engine and brake controllers cooperate to maintain the vehicle speed at or near the base target speed.

15. A vehicle speed control system for maintaining vehicle speed at a base target speed when the control system is activated by a vehicle driver, the system comprising:

a slope sensor for directly or indirectly determining the slope of the ground on which the vehicle is traveling;

a speed sensor for directly or indirectly determining the vehicle speed;

an engine controller for generating an engine torque request signal to operate an engine/drivetrain so as to control the vehicle speed at an engine target speed;

a brake controller for generating a brake request signal to operate vehicle brakes so as to control the vehicle speed at a brake target speed;

wherein when the vehicle is traveling uphill the brake target speed is greater that the engine target speed and the base target speed corresponds to the engine target speed;

wherein when the vehicle is traveling uphill and the driver requests braking, the engine controller continues to generate the engine torque request signal until the driver's braking pressure reaches a predetermined level which is a function the steepness of the slope; and wherein the engine and brake controllers cooperate to maintain the vehicle speed at or near the base target speed.

* * * * *

UNITED STATES PATENT AND TRADEMARK OFFICE
CERTIFICATE OF CORRECTION

PATENT NO. : 9,914,454 B2
APPLICATION NO. : 14/650456
DATED : March 13, 2018
INVENTOR(S) : Sean Simmons et al.

Page 1 of 1

It is certified that error appears in the above-identified patent and that said Letters Patent is hereby corrected as shown below:

Claim 4, Column 20, Line 48, after wherein delete "the".

Signed and Sealed this
Fifteenth Day of May, 2018

Andrei Iancu
*Director of the United States Patent and Trademark Office*